United States Patent

Wrona, deceased et al.

[15] 3,653,601

[45] Apr. 4, 1972

[54] ENDLESS TAPE MAGAZINE

[72] Inventors: Carl Wrona, deceased, late of Walddorf/Nagold, Germany by Casper Antonius Henricus Mulkens, executor; Wilhelmus Franciscus Aloysius Heylands, Eindhoven, Netherlands

[73] Assignee: U.S. Philips Corporation, N.Y., N.Y.

[22] Filed: Aug. 15, 1969

[21] Appl. No.: 871,100

Related U.S. Application Data

[62] Division of Ser. No. 648,505, June 23, 1967.

[30] Foreign Application Priority Data

June 25, 1966 Germany ..............................W 41869
Nov. 9, 1966 Germany ..............................N 29467

[52] U.S. Cl. ....................242/55.19 A, 179/100.2 Z, 274/4 B

[51] Int. Cl. ......................................................B65h 17/48

[58] Field of Search .............242/55.19 A, 55.19; 179/100.2; 274/4 B, 11 B

[56] References Cited

UNITED STATES PATENTS

| | | | |
|---|---|---|---|
| 2,288,983 | 7/1942 | Weiss | 242/55.19 A |
| 3,001,025 | 9/1961 | Gaubert | 242/55.19 A |
| 3,030,041 | 4/1962 | Cousino | 242/55.19 A |
| 3,285,527 | 11/1966 | Cole, Jr. | 242/55.19 A |

*Primary Examiner*—Billy S. Taylor
*Attorney*—Frank R. Trifari

[57] ABSTRACT

An endless magnetic tape magazine constructed as an oblong box for use on a conventional recording/playback apparatus having a pair of winding spindles. Two pair of aligned apertures are provided through the bottom and top cover of the box. The apertures are spaced apart so as to accommodate the winding spindles of the apparatus. The magazine is provided with a rotatably mounted core about one of the apertures for accommodating a roll of endless tape, and arranged so as to rotate about the spindle passing through the aperture. Guide rollers are provided for guiding the tape along the inside of the magazine and back onto the roll and an additional pair of aligned apertures is also provided for accommodating a drive capstan and insuring correct positioning of the magazine within the recording/playback apparatus.

4 Claims, 6 Drawing Figures

INVENTORS
CARL WRONA, DECEASED
By CASPER ANTONIUS HENRICUS MULKENS, EXECUTOR
WILHELMUS FRANCISCUS ALOYSIUS
By Frank R. Trifari
AGENT

INVENTORS

CARL WRONA, DECEASED
By CASPER ANTONIUS HENRICUS MULKENS, EXECUTOR
WILHELMUS FRANCISCUS ALOYSIUS

By Frank R. Trifari
AGENT

INVENTORS
CARL WRONA, DECEASED
By CASPER ANTONIUS HENRICUS MULKENS, EXECUTOR
WILHELMUS FRANCISCUS ALOYSIUS
By Frank R. Trifari
AGENT

ENDLESS TAPE MAGAZINE

This is a division of application Ser. No. 648,505, filed June 23, 1967.

The invention relates to a magnetic tape magazine, in particular, to a magazine having a winding core which supports a roll of magnetic tape in a housing which has the shape of an oblong box having a bottom, a cover, and side walls. The bottom and the cover have apertures in alignment with each other so that the magazine can be placed on two winding spindles and a driving shaft of an apparatus, the winding spindles and the driving shaft which can project through the bottom and/or the cover. One of the oblong side walls has apertures along which the magnetic tape is guided by means of two guide rollers, magnetic heads and a driving roller which extend into said apertures when the magazine is placed on the magnetic recorder and/or reproducer and same is switched on.

In known magnetic tape magazines of the kind, during operation, the magnetic tape is uncoiled from the roll and coiled on a second winding core arranged at some distance. These known magnetic tape magazines are constructed symmetrically in such manner that after playing back the tape they are taken out of the apparatus, turned 180° about a central axis extending at right angles to the longitudinal direction of the magazine and again laid in the magnetic recorder in this new position so that they can be played back again. In these magazines two parallel tracks are present on the tape and used in succession.

These known magazines have a finite playing time. For certain applications it is desirable to have the disposal of an endless playing time so that the tape repeats the recordings provided thereon without turning the magazine.

According to the invention this is achieved with a roll of tape constructed as an endless tape roll. The tape is uncoiled from the roll in normal manner at its center adjacent the winding core and is fed onto the roll at its outside, the loop of tape formed being guided through the guide rollers, the winding core being journalled so as to be freely rotatable about the axis of one of the spindle apertures in the housing of the magazine and comprising a central aperture which is larger than the aperture for the spindle.

As a result the endless playing magnetic tape magazine is adaptable for use on apparatus which are constructed fro the recording and/or playback of magnetic tapes in magazines and have two winding cores. In principle such apparatus need not be specially designed for playing endless tape magazines, nor is it necessary to use any additional auxiliary means.

It is to be noted that magazines are known which play endless record carriers in tape form. These magazines have to be used in an apparatus which is specially designed for such magazines. Such an apparatus is not suitable for use of other magazines.

In a preferred embodiment of the magnetic tape magazine according to the invention the roll of tape is located on that side of the magazine which is near a guide roller. The guide roller supplies the magnetic tape to the roll at its outer periphery. The tape is uncoiled from near the center of the roll.

Since the uncoiled part of the tape lays flat and is bent or twisted before it touches the guide roller, it is advantageous for the largest possible distance to be available so that said bending operations are facilitated and no excessive friction can occur between the tape and the surface of the cover of the housing.

In this connection it is favorable to provide in the surface of the cover and the bottom, respectively, a single pair of aligned apertures for the passage of the driving shaft on that side of the magazine where the roll of tape is located. The magazine will automatically be placed correctly in the apparatus because of these aligned apertures. As already stated above, a normal magnetic tape magazine can be laid in two different positions in an apparatus and for that purpose the magazine has two pairs of apertures for the passage of the driving shaft which are located as mirror images with respect to each other. Since in a magazine of the type described only one pair of aligned apertures for the passage of the driving shaft is present, inserting the magazine in the magnetic recorder is consequently only possible in the correct position and thus it is unlikely that faulty insertion of the magazine, with resultant damage, will occur.

In addition it is also advantageous to provide a recess on the inner surface of the side of the cover, which recess may be provided during molding and which extends from the point of engagement of the tape to the guide roller which supplies the tape to the magnetic heads tangentially to the point where the tape leaves the winding core, said recess having a depth of approximately half the thickness of the cover. In this manner the guide of the tape from the roll to the guide roller is facilitated.

In another embodiment of the magazine the central aperture of the winding core is provided with a very smoothly operating slipping clutch.

In magnetic recorders and reproducers normally used for magazines the winding spindle is already connected to the driving motor through a slipping clutch since the tape speed is determined by the driving shaft and the winding spindle must only ensure the winding of the tape material released by the driving shaft. However, this slipping clutch is not sufficient in all circumstances when a magazine is to be used having an endless tape. It therefore may be advantageous if in the manner described a further smoothly operating slipping clutch is provided. The commonly used winding spindles are provided on their circumferences with projections extending in the longitudinal direction and engaging in corresponding recesses of the winding core. In a magazine according to the invention a simple but operative slipping clutch can be obtained when a winding core having a smooth inner aperture is used which is adapted to smoothly fit the ribs of the winding spindle. If required the central aperture of the winding core may also be lined with a suitable friction material.

According to a further advantageous embodiment the magnetic tape magazine is constructed so that an aperture is provided in one of the side surfaces, which aperture permits the entrance of a feeler and latching member which is arranged on a magnetic recorder and which serves to prevent an operating member of the magnetic recorder from being positioned so that fast forward or rewind of the tape is produced, said feeler and latching member being displaced to an inoperative position when a magazine without said aperture is placed on the apparatus.

Magnetic tape magazines of the conventional construction already comprise recesses in the side wall which is located opposite to the entrance apertures for the magnetic heads and the pressure roller. Said recesses are each closed by a plate; if required this plate may be removed. The device is constructed so that the entrance of a control member is possible which prevents the switching of the magnetic recorder to the operating condition "recording" when this is desirable.

In a magnetic tape magazine according to the invention having an endless tape said known apertures may also be provided. It is of advantage, however, to provide in the same side wall a further aperture which makes it possible to influence the magnetic recorder so that it cannot be switched to fast forward or rewind. Rewind could make the magazine fully useless since in an endless tape only one direction of winding can be permitted and fast forward is not recommandable since too great a mechanical load of the tape occurs.

This magnetic tape magazine can be used with a magnetic recorder of the type having an operating member for switching on the fast forward or rewind condition of the tape, and including a feeler and latching member which in its rest position prevents a movement of the operating member into a position for fast forward or rewind condition of the tape, said feeler and latching member being connected to a lug which is arranged on the magnetic recorder in such manner that, when a magazine which comprises an endless tape is laid on the apparatus, it enters into an aperture of a side face of said magazine. If required the latching device may alternatively be constructed so that it does not prevent both the fast forward and rewind but only prevents the rewind condition.

In order that the invention may be readily carried into effect a few examples thereof will now be described in greater detail, by way of example, with reference to the accompanying drawings, in which FIG. 1 is a plan view of a magnetic tape magazine according to the invention.

Figure 1:
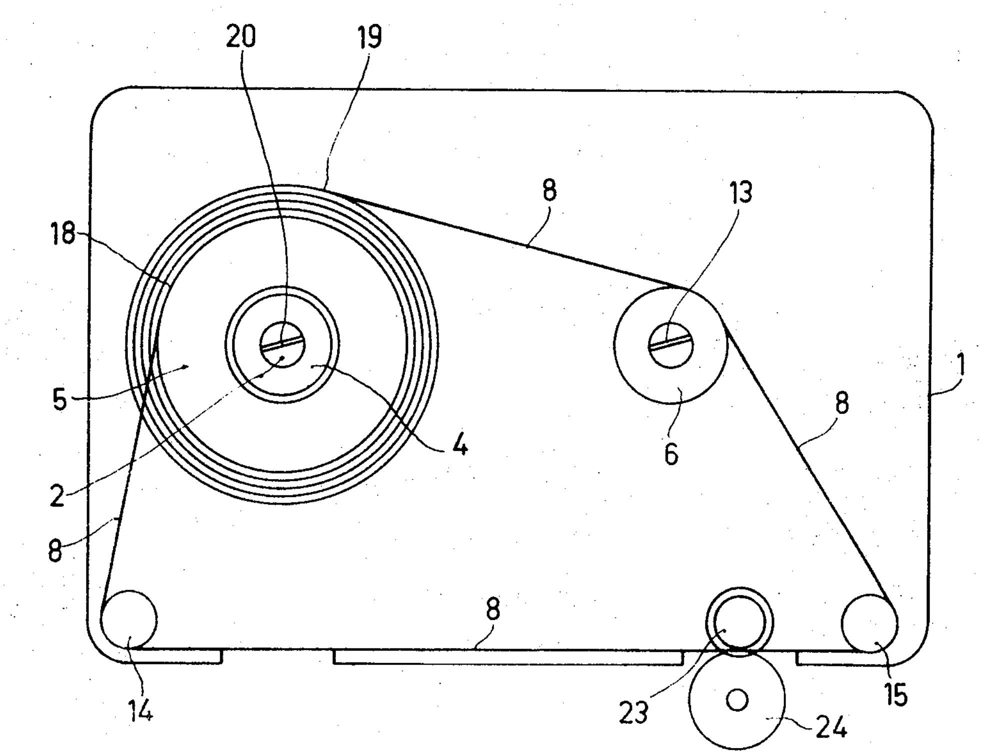

The plan view of FIG. 1 shows a magnetic tape magazine according to the invention in which a box-like housing 1 comprises a core with an endless tape. The core itself consists of a rigid part 4 and a part 5 rotating thereon, the fixed part 4 being arranged by means of the internal aperture 2 on a spindle 20 of a magnetic recorder/reproducer not shown. However, the device is such that the part 4 cannot rotate. The tape roll is arranged in normal manner on the rotatable part 5. A second spindle 13 of the magnetic recorder/reproducer extends in the magazine on the right-hand side of the magazine, on which spindle a guide roller 6 is provided. The tape is uncoiled in normal manner on the inside of the tape roll at the point 18, runs through guide rollers 14 and 15 on the front along the magazine and is supplied again to the tape roll on the outer circumference at point 19, past the guide roller 6. For driving the tape a driving shaft or capstan 23 which is associated with the magnetic recorder/reproducer is used which is located behind the tape 8 guided on the front of the housing, a rubber pressure roller 24 pressing from the outside against the tape after the magazine is placed on the magnetic recorder/reproducer. So the rotating capstan 23 pulls the tape 8 from the coil conveys it along the magnetic heads of the recorder/reproducer not shown and the tape is finally supplied again to the roll in the above-described manner.

Figure 2:
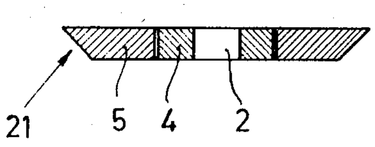
FIG. 2 is a cross-sectional view of the core of the tape roll of the magazine shown in FIG. 1.

FIG. 2 shows the core of the tape roll in cross-section and from this it appears that the core consists of a rigid part 4 having a central aperture 2 and a part 5 rotatable thereon which comprises a surface 21, which is conical at the outer circumference, for receiving the roll of tape.

Figure 3:
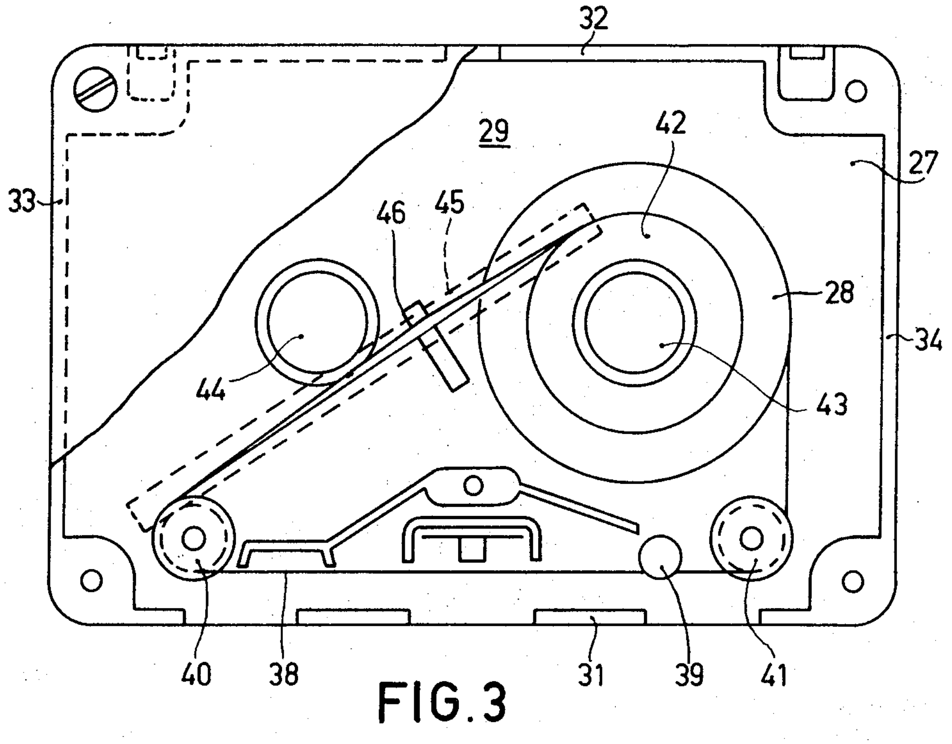
FIG. 3 is a plan view of a further embodiment of a magnetic tape magazine according to the invention in which the surface of the cover is broken away for the greater part.
Figure 4:
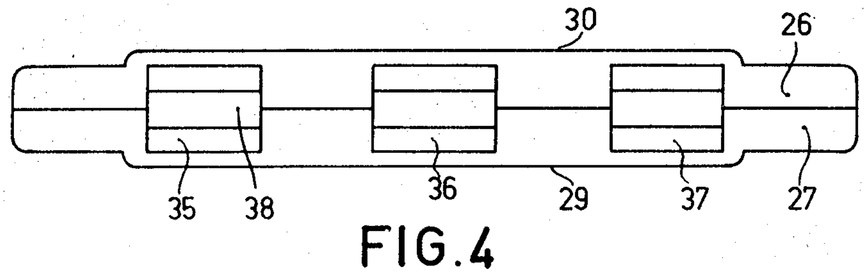
FIG. 4 is a front elevation of the casing shown in FIG. 3.
Figure 5:
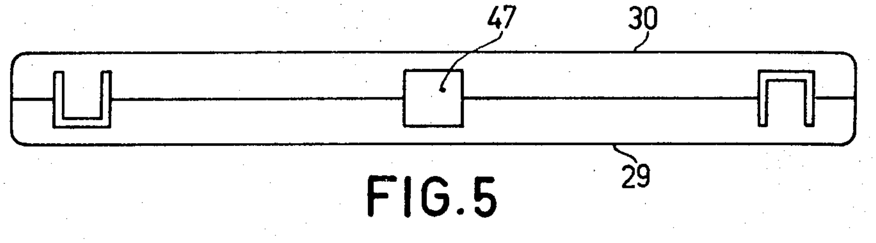
FIG. 5 shows the same magazine in a rear view.

The magazine shown in FIGS. 3 to 5 comprises two halves 26, 27 fitting together as mirror images and enclosing a tape roll 28. The bottom surface of the magazine is denoted by 29, the cover surface by 30 and the side surfaces by 31, 32, 33 and 34. The foremost side surface 31 comprises apertures 35, 36 and 37 along which the tape 38 of the roll 28 is guided. When the magazine is laid on a magnetic recorder/reproducer and the apparatus is switched on, the magnetic heads and the pressure roller enter said apertures 35, 36, 37 thus locking the magazine in the magnetic recorder. The capstan of the apparatus passes through an aperture 39 in the bottom surface 29 and the tape 38 is guided through guide rollers 40 and 41, respectively, provided at the corners of the magazine.

The invention uses an endless tape which is uncoiled in normal manner from its winding core 42 and is returned to the roll 28. The housing 26, 27 of the magazine comprises two apertures 43, 44 for the winding spindles of a magnetic recorder arranged at some distance from one another and the roll of tape is located on the side of the magazine, in FIG. 3 on the right, which is in the proximity of the guide roller 41 which the tape to the roll.

As shown in FIG. 3 only one pair of apertures 39 which are in alignment, are located on that side of the magazine where the tape roll 28 is located, and provide for the passage of the capstan through the surfaces 29 and 30. The conventional magnetic tape magazines have two pairs of aligned apertures for the passage of the capstan, this being necessary to enable insertion of the magazine in the magnetic recorder in the inverted position. In this case a dual track tape is used so that the two tracks can be reproduced after the magazine has been inverted. Inverting of the magazine is not desired with the endless tape and should be avoided, because of the one directional drive. By using only one pair of apertures for the passage of the capstan it will insure that the magazine can be laid in the magnetic recorder only in the correct position.

As shown in FIG. 3 the inner surface of the cover 30 comprises a recess 45 which is molded or provided as is shown in broken lines in FIG. 3 and which extends from the point where the tape touches the guide roller 40, which supplies the tape to the magnetic heads tangentially, to the point where the tape leaves the winding core 42. This recess has a depth of approximately half the thickness of the cover and serves to facilitate the guiding of the tape. The magazine may have a thickness which is slightly larger than the width of the tape, this will permit the self-supporting roll 28 to be coiled correctly.

The tape is uncoiled in such manner that its width initially extends at right angles to the plane of the drawing; then it is turned 90°, and immediately before it touches the guide roller it is reverted again to a position in which it is at right angles to the plane of the drawing. The recess 45 facilitates said turning of the tape about its longitudinal axis and a rib 46 arranged on the part 29 of the housing serves for the further guiding of the tape. In addition, it is essential that the distance between the point where the tape leaves the winding core 42 and the point where the tape contacts the guide roller 40 be as large as possible. This is accomplished by locating the roll 28 near the guide roller 41.

The central aperture 43 of the winding core 42 is provided with an additional slipping clutch which operates particularly smoothly. The diameter of the aperture 43 is adapted to the diameter of the associated winding spindle so that the winding spindle so that the winding core can rotate on the winding spindle with the desired low friction which, however, is not negligible. Naturally, other additional means to reach the desired slipping may be provided.

In the magnetic tape magazine shown in FIGS. 3 to 5 an aperture 47 is provided in the rear side surface 32. This aperture permits the entrance of a feeler and latching member which is provided on a magnetic recorder and serves to prevent an operating member of the magnetic recorder from being positioned so that fast forward or rewind of the tape is produced. When a magazine which does not have an aperture 47 is laid on the magazine, the feeler and latching member will be displaced to an inoperative position. Thus both magazines of the conventional construction and magazines according to the present invention can be used on the magnetic recorder without danger that with an endless tape inserted in the magnetic recorder the fast forward or the rewind may accidentally be switched on.

Figure 6:
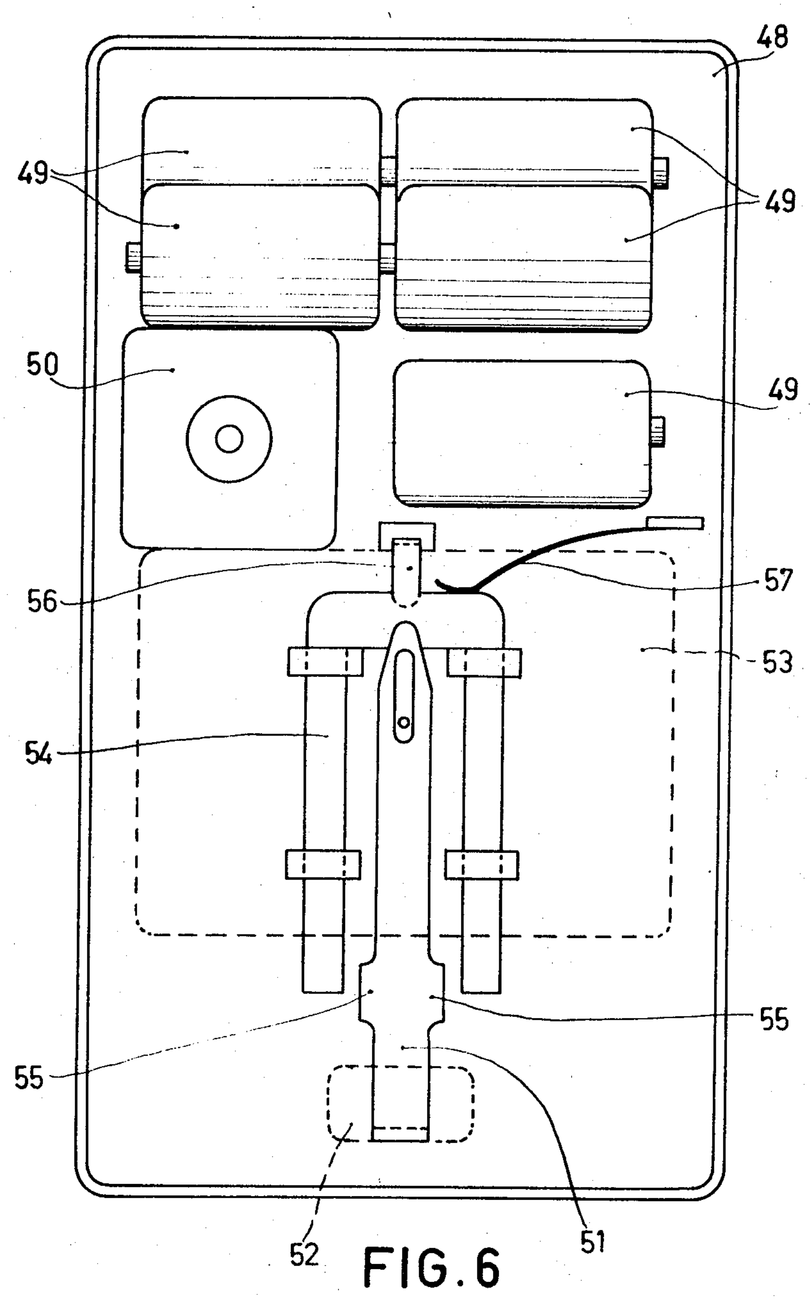
FIG. 6 is an underneath view of an opened magnetic recorder in which a locking device is visible.

FIG. 6 is a bottom view of a magnetic recorder and/or reproducer which is provided with such a locking device. This figure shows only those parts which are of importance for a better understanding of the invention.

The magnetic recorder shown in FIG. 6 comprises in a housing 48 the batteries 49 for the operating current and the driving motor 50. In the lower part of the drawing the inner part of a switching lever 51 is visible which can be moved in three different directions by a button 52 which can be operated from without. Its lower end can be moved to the left or to the right in which the fast forward and rewinding respectively. The lever can be switched in a manner which is not shown and the switching lever 51 can also be moved in a longitudinal direction in which recording and play-back are switched. The magazine 53 inserted in the recorder is shown in broken lines in FIG. 6 since it is not directly visible.

According to the invention the magnetic recorder and/or reproducer has feeler and latching device 54 which consists of a U strip of sheet steel which is journalled so as to be movable in the longitudinal direction of its limbs. The limbs of the locking device 54 extend on the right and on the left of the switching lever 51 so that in the position shown it prevents a lateral movement of the switching lever 51. For this purpose the latter is provided on both sides with projections 55, the distance between the limbs of the U strip and said projections being shown on an exaggerated scale.

At its central part the locking device 54 comprises an angularly bent lug 56 which is arranged on the recorder/reproducer in such a manner that when a magazine is inserted which comprises an endless tape said lug enters the aperture 47 of the side surface 32 of the magazine. A spring 57 exerts pressure on the locking device 54 and guides said device in the locked position as long as the lug 56 has not been moved upwards by a magazine which does not have the said aperture 47.

From this it appears that when a magazine of the normal construction which does not have an aperture 47 is inserted in the apparatus the locking device 54 is moved upwards to such an extent that the end of the U limbs release the projections 55. So a conventional magazine can be reproduced in normal manner in which fast forward and rewind, respectively, are possible. If, however, a magazine according to the invention employing an endless tape is inserted, the angularly bent lug 56 enters the aperture 47; the locking device 54 is not removed, so assumes its rest position in which the ends of the U limbs, as shown in FIG. 6, prevent a lateral movement of the switching lever 51 and consequently a fast forward and rewind.

What is claimed is:

1. A magazine for accommodating therein a single endless magnetic tape and arranged for use on a conventional recording and playback apparatus having a pair of winding spindles, said magazine comprising a housing constructed as an oblong box having a bottom, a top cover, front and back side walls and a pair of end side walls, first and second aligned pairs of aperture passing through said bottom and said top cover, said apertures being spaced apart for accommodating therethrough the winding spindles of said apparatus, a core about said second pair of apertures for supporting a roll of endless magnetic tape, said tape being unwound from the center of said roll adjacent said core and wound about its outer periphery, said core being journalled so as to be freely rotatable about the axis journalled said second aperture, said core having a central opening larger than said second aperture so that said core may rotate on the spindle passing therethrough with little friction, so that there will be no positive coupling between the core and the winding spindle, a third pair of aligned apertures passing through said bottom and top cover for accommodating a driving capstan of said apparatus, first and second guide rollers mounted between said bottom and said cover for guiding the magnetic tape which is being unwound from said endless tape roll along the inside of said front side wall and back onto the outer periphery of said roll, said second guide roller being arranged for feeding said tape back onto said roll and being located on the same side of the transverse axis of said housing as is said core, said first guide roller being located on the other side of said axis with said first pair of aligned apertures, and a plurality of apertures in said front side wall for receiving magnetic heads and a driving roller of said apparatus for engaging the tape being passed along said front side wall.

2. The tape magazine according to claim 1 wherein said third pair of aligned apertures for accommodating said driving shaft is located on the same side of said housing as is said second guide roller and said core.

3. The tape magazine according to claim 2 further comprising recess on the inner surface of said top cover for guiding said tape as it leaves said roll, said recess having a depth of approximately half the thickness of said top cover, said recess extending from the point where the tape is unwound from said roll to the point where said tape engages said first guide roller.

4. The tape magazine according to claim 3 further comprising an aperture in said back side wall for receiving therein means on a recording apparatus which when in engagement with said aperture will prevent operation of fast forward and rewind functions of said apparatus.

* * * * *